US005634349A

United States Patent [19]
Kakehashi et al.

[11] Patent Number: 5,634,349
[45] Date of Patent: Jun. 3, 1997

[54] AIR CONDITIONER

[75] Inventors: Nobuharu Kakehashi, Anjo; Takayuki Morita, Nagoya, both of Japan

[73] Assignee: Nippondenso Co., Ltd., Kariya, Japan

[21] Appl. No.: 542,789

[22] Filed: Oct. 13, 1995

[30] Foreign Application Priority Data

Oct. 14, 1994 [JP] Japan .................................. 6-249242
May 17, 1995 [JP] Japan .................................. 7-118376

[51] Int. Cl.$^6$ .............................. F25B 41/00; F28D 7/10
[52] U.S. Cl. .............................. 62/198; 62/513; 165/157
[58] Field of Search .......................... 62/513, 198, 244; 165/157

[56] References Cited

U.S. PATENT DOCUMENTS

| | | | |
|---|---|---|---|
| 2,181,856 | 11/1939 | McCloy | 62/513 X |
| 5,222,551 | 6/1993 | Hasegawa et al. | 165/167 |
| 5,245,843 | 9/1993 | Shimoya et al. | 62/515 |
| 5,524,455 | 6/1996 | Hasegawa et al. | 62/513 |

*Primary Examiner*—William E. Wayner
*Attorney, Agent, or Firm*—Cushman, Darby & Cushman IP Group of Pillsbury Madison & Sutro LLP

[57] ABSTRACT

According to the present invention, an air conditioner includes a refrigerant-air heat exchange portion having plural refrigerant evaporation passages and heat exchanging between refrigerant flowing in the plural refrigerant evaporation passage and air passing around the plural refrigerant evaporation passages, a refrigerant-refrigerant heat exchange portion having an inlet refrigerant passage and an outlet refrigerant passages and heat exchanging between refrigerant flowing in the inlet refrigerant passage and refrigerant flowing in the outlet refrigerant passage, a pressure reducing unit placed in an upstream side of the plural refrigerant evaporation passages, and a unit case having an air flow passage therein. The refrigerant-air heat exchange portion is contained in the air flow passage, and the unit case contains the refrigerant-refrigerant heat exchange portion outside the air flow passage. Since the refrigerant-refrigerant heat exchange portion is contained outside the air flow passage in the unit case, the air passing in the air flow passage will not collide with the refrigerant-refrigerant heat exchange portion. Thus, air flow is restrained from being turbulent. In this way, uneven wind speed distribution is not formed in the air passing around the plural refrigerant evaporation passages of the refrigerant-air heat exchange portion, and therefore, distribution of the temperature in the air is not caused in the refrigerant-air heat exchange portion.

9 Claims, 7 Drawing Sheets

FIG. 7

AIR CONDITIONER

CROSS REFERENCE OF THE RELATED APPLICATION

The present invention is based on and claims priority from Japanese application Nos. 6-249242, filed on Oct. 14, 1994 and 7-118376, 1995 filed on May 17, 1995, both subject matter of which are incorporated herein by reference.

BACKGROUND OF THE INVENTION

1. Field of the Invention

The present invention relates to a cooling unit used for instance in an automotive air conditioner, more particularly, relates to an air conditioner with a refrigerant evaporator placed in a duct, which comprises a refrigerant-refrigerant heat exchange portion for performing heat exchange between refrigerant passing through an inlet passage and refrigerant passing through an outlet passage.

2. Description of the Related Art

In a refrigerant evaporator as a component of a cooling unit for an air conditioner, it is desirable to keep the amount of refrigerant distributed to plural refrigerant evaporation passages even in order to improve the heat exchanging efficiency (cooling efficiency).

Therefore, for example, Japanese Patent Application Laid-Open No. 5-196321 discloses a refrigerant evaporator comprising a refrigerant-refrigerant heat exchange portion having an inlet passage in which refrigerant from an expansion valve flows and an outlet passage to flow out refrigerant to a refrigerant compressor, and a refrigerant-air heat exchange portion including plural refrigerant evaporation passages passing to the inlet passage via a pressure reducing unit and evaporating the refrigerant by heat exchanging air with the refrigerant from the inlet passage.

Here, considering air flow resistance of the refrigerant-air heat exchange portion for the refrigerant evaporator, it is conceived to place the refrigerant-air heat exchange portion for the refrigerant evaporator inside a duct and to place the refrigerant-refrigerant heat exchange portion outside the duct.

In such a case, however, when the air outside the duct touches the refrigerant-refrigerant heat exchange portion, vapor in the air outside the duct condenses, which causes the drops of water adhering to the surface of the refrigerant-refrigerant heat exchange portion, because low pressured refrigerant passes within the refrigerant-refrigerant heat exchange portion. Consequently, a drain mechanism to drain the drops of water adhering to the surface of the refrigerant-air heat exchange portion in the duct needs an additional drain mechanism to drain the drops of water adhering to the refrigerant-refrigerant heat exchange portion extending outside the duct. Thus the cost of the cooling unit increases, which results in a problem to raise a price for an air conditioner.

For the purpose of solving the above mentioned problem, it is considered to employ a cooling unit including both the refrigerant-air and the refrigerant-refrigerant heat exchange portions therein and to provide a drain mechanism for the drops of water below a unit case of the cooling unit.

Regarding this cooling unit, however, since the refrigerant-refrigerant heat exchange portion is placed in the air flow passage in the unit case, the air flowing in the air flow passage from the upstream side of the refrigerant evaporator collides against the refrigerant-refrigerant heat exchange portion, which generates turbulent air flow. Thus, wind speed distribution is formed in the air passing around the plural refrigerant evaporation passages of the refrigerant-air heat exchange portion for the refrigerant evaporator, and it causes a problem in that the temperature distribution of the air passing around the plural refrigerant evaporation passages is deteriorated, even if the refrigerant is evenly distributed to the plural refrigerant evaporation passages of the refrigerant-air heat exchange portion.

SUMMARY OF THE INVENTION

A purpose of the present invention is to provide an air conditioner which has a common drain mechanism for the drops of water adhering to the surfaces of the refrigerant-air and the refrigerant-refrigerant heat exchange portions, thereby the price increase being suppressed.

Another purpose of the present invention is to provide an air conditioner which can suppress uneven distribution of air temperature by preventing turbulent air flow in the air flow passage of the unit case and can effectively use the space around the unit case.

According to the present invention, an air conditioner includes a refrigerant-air heat exchange portion having plural refrigerant evaporation passages to evaporate refrigerant flowing therein and heat exchanging between refrigerant flowing in the plural refrigerant evaporation passages and air passing around the plural refrigerant evaporation passages, a refrigerant-refrigerant heat exchange portion having an inlet refrigerant passage in which the refrigerant flows toward the plural refrigerant evaporation passages and an outlet refrigerant passages in which refrigerant coming from the plural refrigerant evaporation passages and heat exchanging between refrigerant flowing in the inlet refrigerant passage and refrigerant flowing in the outlet refrigerant passage, a pressure reducing unit placed in an upstream side of the plural refrigerant evaporation passages, and a unit case having an air flow passage therein, the refrigerant-air heat exchange portion being contained in the air flow passage, and the unit case containing the refrigerant-refrigerant heat exchange portion outside the air flow passage.

In this way, the refrigerant flowing in the inlet refrigerant passage in the refrigerant-refrigerant heat exchange portion is heat exchanged with the refrigerant flowing in the outlet refrigerant passage, thereby the refrigerant being condensed and liquified.

When the refrigerant flows in the pressure reducing unit, the pressure of the refrigerant is reduced and the refrigerant is evenly distributed to each refrigerant evaporation passage of the refrigerant-air heat exchange portion.

When the refrigerant pass through the plural refrigerant evaporation passages, the refrigerant is heat exchanged with air passing in the air flow passage of the duct, thereby the refrigerant being evaporated and vaporized. The air is then cooled by evaporation and vaporization of the refrigerant. The refrigerant flowing out from the plural refrigerant evaporation passages flows in the outlet refrigerant passage of the refrigerant-refrigerant heat exchange portion. The refrigerant flowing in the outlet refrigerant passage is heat exchanged with the refrigerant passing in the inlet refrigerant passage and the refrigerant is further evaporated and vaporized, thereby being overheated vapor.

Since the refrigerant-refrigerant heat exchange portion is contained outside the air flow passage in the unit case, the air passing in the air flow passage will not collide with the refrigerant-refrigerant heat exchange portion. Thus, air flow is restrained from being turbulent. in this way, uneven wind speed distribution is not formed in the air passing around the plural refrigerant evaporation passages of the refrigerant-air heat exchange portion, and therefore distribution of the temperature in the air is not caused in the refrigerant-air heat exchange portion.

BRIEF DESCRIPTION OF THE DRAWINGS

Other objects, features and characteristics of the present invention as well as the functions of related parts will become more clear from a study of the following detailed description, the appended claims, and the drawings. In the accompanying drawings:

DETAILED DESCRIPTION OF THE PREFERRED EMBODIMENTS

Next, the air conditioner according to the present invention will be described with reference to embodiments applied to an air conditioner for a vehicle, more particularly, to an automotive air conditioner.

Figure 1:
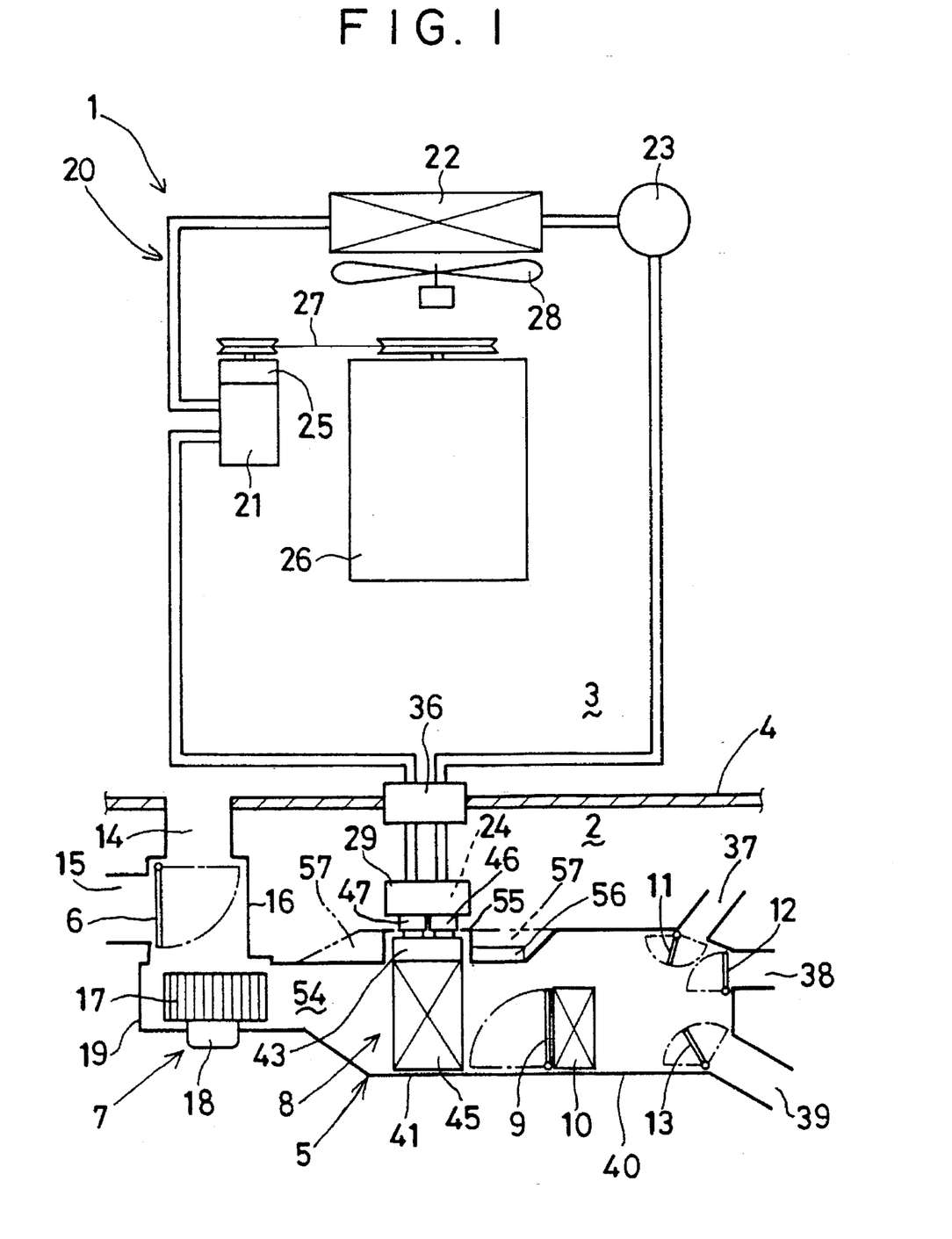
FIG. 1 is a schematic view illustrating an automotive air conditioner applied to the first embodiment according to the present invention.
Figure 2:
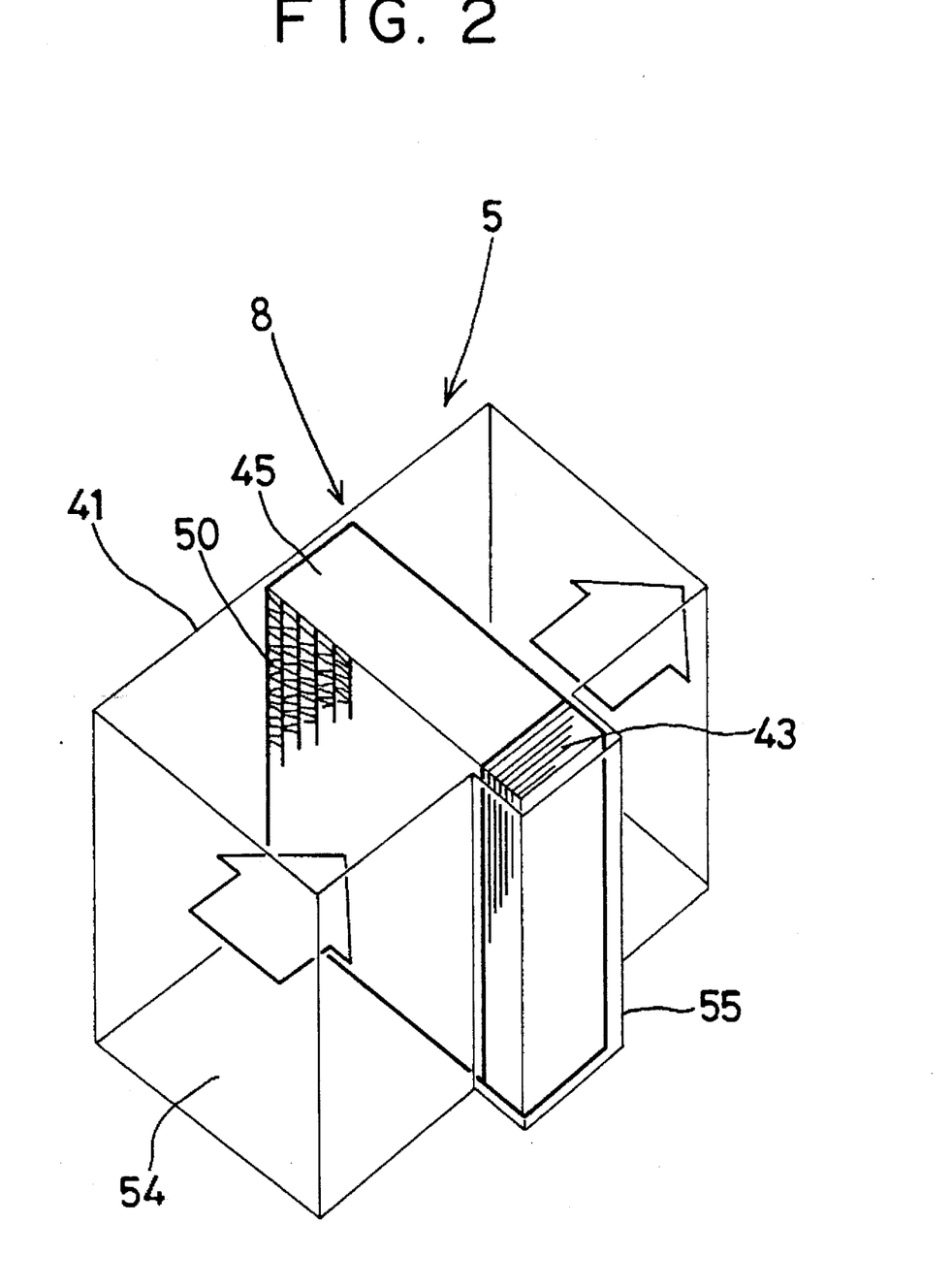
FIG. 2 is a perspective view illustrating a cooling unit applied to the first embodiment according to the present invention.
Figure 3:
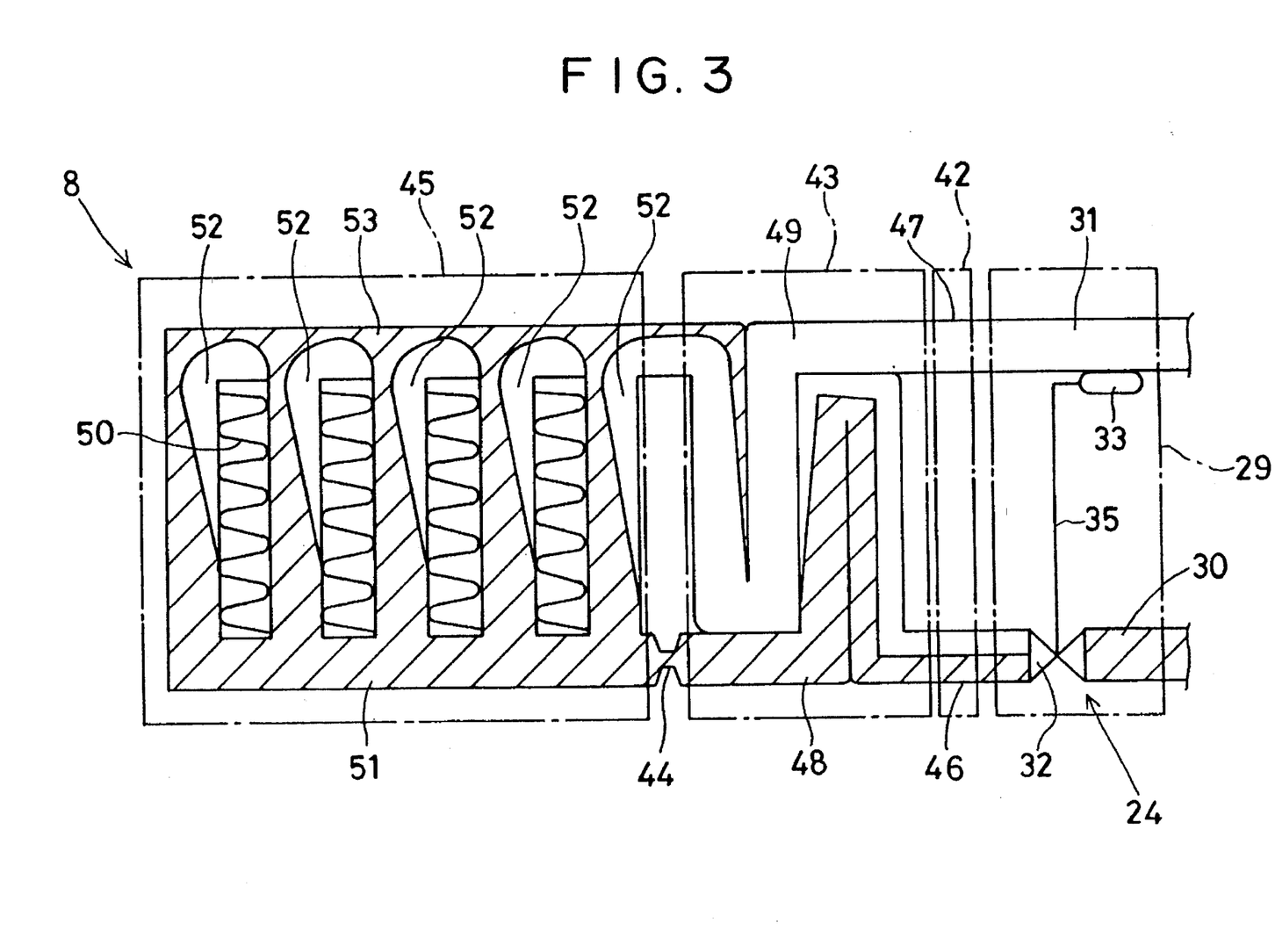
FIG. 3 is a schematic view illustrating a laminated type refrigerant evaporator applied to the first embodiment according to the present invention.

FIGS. 1 to 3 illustrate the first embodiment of the present invention. FIG.1 illustrates an automotive air conditioner, and FIG. 2 illustrates a cooling unit for the automotive air conditioner.

An automotive air conditioner 1 has a duct 5 fixed on the side of a compartment 2 through a dashpanel 4 which divides the compartment 2 from an engine room 3. An inside/outside air switching damper 6, a multi-vane blower 7, a laminated type refrigerant evaporator 8, an air mixing damper 9, a heater core 10, a defrost damper 11, a face damper 12 and a foot damper 13 are installed in duct 5.

Inside/outside air switching damper 6 is actuated by actuating means such as a servomotor and so forth, and switches over an outside air inlet mode to introduce outside air from an outside air intake port 14 of duct 5, and an inlet switching mode such as an inside air circulation mode to introduce inside air from an inside air intake port 15. Inside/outside air switching damper 6 is rotatably supported in an inside/outside air switching case 16 which constitutes the most upstream portion of duct 5.

Multi-vane blower 7 comprises a fan 17 to generate air flow flowing toward compartment 2 in duct 5, a blower motor 18 to actuate and rotate fan 17, and a spiral type casing 19 in which fan 17 is rotatable disposed. Spiral type casing 19 constitutes a lateral part of the upstream in duct 5, and is united with the downstream of inside/outside air switching case 16.

Laminated type refrigerant evaporator 8 is so-called a refrigerant evaporator of a refrigerant cycle 20 and cools air sent by multi-vane blower 7 according to the operation of refrigerant cycle 20. Refrigerant cycle 20 further includes a refrigerant compressor 21, a refrigerant condenser 22, a receiver 23, a thermostatic expansion valve 24 and so forth in addition to laminated type refrigerant evaporator 8. Refrigerant cycle 20 starts when rotational force of an engine 26 is transmitted to refrigerant compressor 21 via a belt 27 by supplying electricity (to turn on) an electromagnetic clutch 25 of refrigerant compressor 21. As actuating means of refrigerant compressor 21, an electric motor can be used instead of engine 26.

Refrigerant compressor 21 is installed near engine 26 in engine room 3, and is linked with engine 26 via electromagnetic clutch 25 and belt 27. This refrigerant compressor 21 compresses the refrigerant which has been taken therein and discharges high temperature and high pressure gas refrigerant.

Refrigerant condenser 22 is disposed in engine room 3 so as to be easily affected by the wind generated by driving the automobile. Refrigerant condenser 22 condenses and liquifies the refrigerant by heat exchanging the outside air blown by a cooling fan 28 with high temperature and high pressure gas refrigerant.

Receiver 23 is fixed near refrigerant condenser 22 in engine room 3. Receiver 23 functions as a gas-liquid separator and a receiver to supply only liquified refrigerant to thermostatic expansion valve 24 after separating gas refrigerant from liquified refrigerant.

Thermostatic expansion valve 24 automatically regulates reduced pressure amount and refrigerant circulation amount, for example, keeps overheat amount constant at the outlet of laminated type refrigerant evaporator 8 so as to finish evaporation and vaporization of the refrigerant at the outlet of laminated type refrigerant evaporator 8 to perform the maximum cooling capacity of laminated type refrigerant evaporator 8. Thermostatic expansion valve 24 is a box type expansion valve and is placed in a metal housing 29, which is installed at the side of compartment 2 from dashpanel 4 of the automobile.

Housing 29 functions as an upstream refrigerant pipe and a downstream refrigerant pipe of the present invention, and comprises, as illustrated in FIG. 3, an inlet refrigerant passage 30 to flow the refrigerant to laminated type refrigerant evaporator 8 and an outlet refrigerant passage 31 to flow out the refrigerant from laminated type refrigerant evaporator 8. Further, an expansion valve body 32 is fixed in inlet refrigerant passage 30 and a thermo-sensitive tube 33 is fixed in outlet refrigerant passage 31. Thermo-sensitive tube 33 can be fixed so as to keep in touch with the outer circumference surface of the refrigerant pipe for outlet refrigerant passage 31.

Expansion valve body 32 includes a needle valve (not shown), a diaphragm (not shown) and so forth. A diaphragm chamber formed at one end of the diaphragm communicates with the inside of thermo-sensitive tube 33 by a capillary tube 35. Housing 29 are connected to refrigerant compressor 21 and receiver 23 by a pipe joint 36 mounted on dashpanel 4.

Air mixing damper 9 is rotatable supported at the upstream side of heater core 10. Air mixing damper 9 is actuated by actuating means such as a servomotor and so forth, and adjusts the amount of air passing through heater core 10 and bypassing heater core 10 in accordance with opening degree thereof.

Heater core 10 heats the air, which has passed laminated type refrigerant evaporator 8, according to a cooling water temperature from the cooling water circuit of an automotive engine, and ventilates the air flow toward defrost damper 11, face damper 12 and foot damper 13.

Defrost damper 11, face damper 12 and foot damper 13, are actuated by actuating means such as a servomotor and so forth, open and close respectively a defroster air outlet 37, a face air outlet 38 and a foot air outlet 39 placed in a heater unit case (air outlet switching case) 40 composing the most downstream portion of duct 5. Air mixing damper 9, heater core 10, defrost damper 11, face damper 12 and foot damper 13 are contained in heater unit case (air outlet switching case) 40.

Defrost damper 11, face damper 12 and foot damper 13 are selectively opened or closed so as to switch air outlet modes to a face mode for cooling the inside of the compartment by blowing out mainly cool air toward the head and chest parts of a passenger from the face air outlet 38, or a bi-level mode for heating the compartment comfortably while keeping the air around the head cool and the air around the feet warm, or a foot mode for heating the inside of the compartment by blowing out mainly warm air toward the feet of a passenger, or a foot defrost mode for eliminating cloudiness of the front glass and for heating the inside of the compartment, or a defroster mode for eliminating cloudiness of the front glass and for thawing out ice of the front glass, and so forth.

Next, the detail of laminated type refrigerant evaporator 8 will be described with reference to FIGS. 1 to 3. Portions where liquified refrigerant exists in laminated type refrigerant evaporator 8 is hatched in FIG. 3. Laminated type refrigerant evaporator 8 is, as illustrated in FIG. 2, contained in unit case 41 (shown in FIG. 1) of the cooling unit for automotive air conditioner 1. Unit case 41, made of polypropylene resin, has a rectangular sectional shape.

Laminated type refrigerant evaporator 8 is, as illustrated in FIG. 3, includes a joint block 42 connecting housing 29 where thermostatic expansion valve 24 is disposed therein, a refrigerant-refrigerant heat exchange portion 43 for heat exchanging the refrigerant at the upstream side (inlet side, medium pressure side with the refrigerant at the downstream side (outlet side, low pressure side), a fixed throttle 44 reducing the pressure of the upstream side refrigerant, a refrigerant-air heat exchange portion 45 for heat exchanging the refrigerant passing through fixed throttle 44 with air, and so forth. A drain pan (not shown) as a drain mechanism for condensed water (water drops) is placed below laminated type refrigerant evaporator 8, that is, in unit case 41 under refrigerant-refrigerant heat exchange portion 43 and refrigerant-air heat exchange portion 45 or below unit case 41. A drain hose (not shown) is fixed on the drain pan to drain the condensed water outside an automobile.

A joint block 42 is equipped with an inlet pipe (inlet passage) 46 communicating with inlet refrigerant passage 30 in housing 29, outlet pipe (outlet passage) communicating with outlet refrigerant passage 31 in housing 29, and so forth. Inlet pipe 46 and outlet pipe 47 are installed in laminated type refrigerant evaporator 8 so as to extend from the inside of unit case 41 to engine room 3 passing through the outer surface of engine room 3 of unit case 41.

Refrigerant-refrigerant heat exchange portion 43 condenses and liquifies the upstream refrigerant, and evaporates and vaporizes the downstream refrigerant by heat exchanging the upstream refrigerant with the downstream refrigerant. Refrigerant-refrigerant heat exchange portion 43 comprises plural pairs of thin molded plates laminated by welding, or brazing and so forth.

In refrigerant-refrigerant heat exchange portion 43, an inlet refrigerant passage 48 for introducing the refrigerant from inlet pipe 46 to fixed throttle 44, and outlet refrigerant passage 49 for introducing the refrigerant from refrigerant-air heat exchange portion 45 to outlet pipe 47 are formed in such a manner that each of these passages 48 and 49 meanders. Inlet refrigerant passage 48 and outlet refrigerant passage 49 are closely placed over a predetermined distance so that the heat exchange can be performed between the upstream refrigerant passing through inlet refrigerant passage 48 and the downstream refrigerant passing through outlet refrigerant passage 49.

Fixed throttle 44 functions as pressure reducing means of the present invention and is formed as a capillary shape by crashing a part of a coupled molded plates between refrigerant-refrigerant heat exchange portion 43 and refrigerant-air heat exchange portion 45. Fixed throttle 44 reduces a pressure of the refrigerant passing therein by throttling a passage area to introduce the refrigerant from inlet refrigerant passage 48 to refrigerant-air heat exchange portion 45.

Refrigerant-air heat exchange portion 45 evaporates and vaporizes the refrigerant by heat exchanging the refrigerant and the air to cool the air.

Refrigerant-air heat exchange portion 45 comprises plural pairs of thin molded plates and corrugated fins 50 which are laminated by welding, or brazing and so forth, to improve the efficiency for a heat exchange of the refrigerant with the air passing through unit case 41.

Refrigerant-air heat exchange portion 45 has an inlet tank portion 51 to which the refrigerant flows from fixed throttle 44, plural refrigerant evaporation passages 52 in which the refrigerant passing therein evaporates and vaporizes, and an outlet tank portion 53 to introduce the refrigerant flowing from plural refrigerant evaporation passages 52 to outlet refrigerant 49 of refrigerant-refrigerant heat exchange portion 43.

In this embodiment, as illustrated in FIGS. 1 and 2, refrigerant-air heat exchange portion 45 is placed in an air flow passage 54 in duct 5 (unit case 41), and refrigerant-refrigerant heat exchange portion 43 is placed in a convex-shaped protruding portion 55 formed outside air flow passage 54. As a result, a fixing space 57 (refer to FIG. 1) is formed to install a control device (computer) controlling each air-conditioning apparatus of automotive air conditioner 1, each air-conditioning control apparatus 56 (refer to FIG. 1) such as relay circuits for supplying electricity and for stopping electric supply to each electric apparatus of automotive air conditioner 1 and so forth, and actuating means such as a servomotor of air mixing damper 9 and so forth on the outer surface at each side (upwind and downwind sides) of protruding portion 55 in unit case 41.

Next, an operation of refrigerant cycle 20 of automotive air conditioner 1 according to the present embodiment will be briefly explained with reference to FIG. 1 to FIG. 3. When engine 26 starts by supplying electricity to electromagnetic clutch 25, rotational force of engine 26 is transmitted to refrigerant compressor 21 by belt 27 and electromagnetic clutch 25. As a result, refrigerant compressor 21 starts compression by taking in the refrigerant from an intake port.

High temperature and high pressure gas refrigerant, compressed by refrigerant compressor 21 and discharged from a discharging outlet, flows in refrigerant condenser 22. When passing through refrigerant condenser 22, the gas refrigerant flowing in refrigerant condenser 22 absorbs the heat by outside air and cooled, condensed, and liquified. The high temperature liquified refrigerant, flowing from refrigerant condenser 22, subsequently flows in receiver 23 in order to separate liquid from gas. Only liquified refrigerant flows in inlet refrigerant passage 30 of housing 29 through pipe joint 36 and reaches expansion valve body 32 of thermostatic expansion valve 24.

The pressure of the liquified refrigerant introduced into expansion valve body 32 is reduced when passing through expansion valve body 32 and becomes refrigerant with a two-phase condition of the gas refrigerant and liquified refrigerant, which flow in inlet refrigerant passage 48 in refrigerant-refrigerant heat exchange portion 43 of laminated type refrigerant evaporator 8 through inlet pipe 46 of joint block 42. In this embodiment, inlet refrigerant passage 48 and outlet refrigerant passage 49 of refrigerant-refrigerant heat exchange portion 43 are closely installed so that the refrigerant flowing therein can be heat exchanged with each other. Thus, the refrigerant with a two-phase condition of gas and liquid flowing in inlet refrigerant passage 48 is cooled by heat exchange with the outlet refrigerant flowing in outlet refrigerant passage 49, and changes from the two-phase condition of gas and liquid to a liquid phase, thereby being almost mono-phase condition.

The refrigerant with almost mono-phase liquid condition flows in fixed throttle 44 and the pressure is reduced while passing through fixed throttle 44. The refrigerant with the two-phase condition of gas and liquid which contains plenty of liquified phase component cooled to low temperature, flows in inlet tank portion 51 of refrigerant-air heat exchange portion 45 and is distributed evenly (uniformly) to each refrigerant evaporation passage 52. The refrigerant, when passing each refrigerant evaporation passage 52, is heat exchanged with the air in air flow passage 54 through corrugated fins 50, thereby being evaporated and vaporized. In this embodiment, since super heat is achieved in outlet refrigerant passage 49 as described below, the refrigerant passing through each refrigerant evaporation passage 52 is prevented from evaporating and vaporizing until refrigerant becomes overheated vapor.

The refrigerant flowing out of respective refrigerant evaporation passages 52 joins together in outlet tank portion 53 and flows in outlet refrigerant passage 49 of refrigerant-refrigerant heat exchange portion 43. The refrigerant flowing in outlet refrigerant passage 49 is heat exchanged with the inlet refrigerant flowing in inlet refrigerant passage 48, and becomes overheated vapor refrigerant with dryness 1. The gas refrigerant as overheated vapor, passing through pipe joint 36 and outlet refrigerant passage 31 of housing 29 equipped with outlet pipe 47 and thermo-sensitive tube 33, is taken in to the intake port of refrigerant compressor 21.

Warm air passing through air flow passage 54 of duct 5 does not collide with refrigerant-refrigerant heat exchange portion 43 by the operation of multi-vane blower 7, because refrigerant-refrigerant heat exchange portion 43 of laminated type refrigerant evaporator 8 is placed outside air flow passage 54. When passing around plural refrigerant evaporation passages 52 of refrigerant-air heat exchange portion 45, the warm air is deprived of heat by the refrigerant and cooled. Subsequently, cool air is blown to compartment 2 from, for instance, face air outlet 38 for cooling.

When the warm air in air flow passage 54 is cooled below the dew point by colliding with corrugated fins 50 of refrigerant-air heat exchange portion 45 of laminated type refrigerant evaporator 8, moisture in the air condenses and liquifies, thereby drops of water adhering to the surface of corrugated fins 50. After dropping under laminated type refrigerant evaporator 8, that is, to a drain pan installed below refrigerant-refrigerant heat exchange portion 43 and refrigerant-air heat exchange portion 45, the drops of water (condensed water) are drained outside the automobile through the drain hose.

As mentioned above, in automotive air conditioner 1, because laminated refrigerant evaporator 8 is equipped with inlet refrigerant passage 48 and fixed throttle 44 in refrigerant-refrigerant heat exchange portion 43 at the upstream side of plural refrigerant evaporation passages 52, the refrigerant flowing in inlet tank portion 51 becomes two-phase condition refrigerant of gas and liquid, which contains plenty of liquid phase components. Thus, the refrigerant can evenly distributed into respective refrigerant evaporation passages 52.

Without making the refrigerant at the outlet of plural refrigerant evaporation passages 52 overheated vapor, but with making the refrigerant at the outlet of outlet refrigerant passage 49 in refrigerant-refrigerant heat exchange portion 43 overheated vapor with the dryness degree 1, heat exchange with the air and the refrigerant can be efficiently performed in the outlet of plural refrigerant evaporation passages 52, therefore, it is possible to achieve uniform cooling performance of the air in the range from the inlet to the outlet of each refrigerant evaporation passage 52.

Therefore, the temperature of the supply air after passing around plural refrigerant evaporation passages 52 can be almost even along the width direction of refrigerant-air heat exchange portion 45 (in the parallel direction of plural refrigerant evaporation passages 52 and in the vertical direction with the direction of air flow in air flow passage 54) and the occurrence of the temperature of the distributed air can be restrained.

Since the flowing direction of the refrigerant in inlet refrigerant passage 48 is opposite to the flowing direction of the refrigerant in outlet refrigerant passage 49, there is a superiority of the heat exchange between the inlet refrigerant and the outlet refrigerant in refrigerant-refrigerant heat exchange portion 43, furthermore, there is also a superiority of the condensing performance (cooling performance) of the refrigerant in inlet refrigerant passage 48 and the evaporating performance (heating performance) of the refrigerant in outlet refrigerant passage 49.

When the refrigerant with medium pressure passes through inlet refrigerant passage 48 of refrigerant-refrigerant heat exchange portion 43 and the refrigerant with low pressure passes through outlet refrigerant passage 49 in case that the air passing in duct 5 (unit case 41) hits refrigerant-refrigerant heat exchange portion 43, vapor in the air condenses, which results in the drops of water adhering to the surface of refrigerant-refrigerant heat exchange portion 43.

According to this embodiment, however, a set of drain pan and drain hose is installed in the lower portion of unit case 41, that is, under refrigerant-refrigerant heat exchange portion 43 and refrigerant-air heat exchange portion 45. Since refrigerant-refrigerant heat exchange portion 43 and refrigerant-air heat exchange portion 45 are placed in unit case 41, a single drain mechanism can be commonly used for refrigerant-refrigerant heat exchange portion 43 and refrigerant-air heat exchange portion 45, thereby an additional drain mechanism for refrigerant-refrigerant heat exchange portion 43 is not required in addition to the drain mechanism for refrigerant-heat exchange portion 45. Thus, production cost for a cooling unit with the drain mechanism mentioned above can be reduced, which leads to the lower production cost for automotive air conditioner 1 with such a cooling unit, as a result, the price of an automobile equipped with automotive air conditioner 1 can be reduced.

In automotive air conditioner 1, because refrigerant-refrigerant heat exchange portion 43 is contained in protruding portion 55 outside air flow passage 54 in unit case 41, air passing through air flow passage 54 does not collide with refrigerant-refrigerant heat exchange portion 43, thereby occurrence of turbulence in the air passing in air flow passage 54 being prevented. Therefore, wind speed distribution of the air, passing around plural refrigerant evaporation passages 52 in refrigerant-air heat exchange portion 45 is not formed. Therefore, the temperature distribution of the air flowing from laminated type refrigerant evaporator 8 (refrigerant-air heat exchange portion 45) in the width direction of refrigerant-air heat exchange portion 45 (in the parallel direction of plural refrigerant evaporation passages 52 and in the vertical direction with the direction of air flow in air flow passage 54) is not caused, and the temperature of the air flowing from laminated type refrigerant evaporator 8 (refrigerant-air heat exchange portion 45) to the width direction of refrigerant-air heat exchange portion 45 is restrained from fluctuating.

In addition, because refrigerant-refrigerant heat exchange portion 43 is contained in protruding portion 55 outside air flow passage 54 in unit case 41, the place where laminated type refrigerant evaporator 8 is installed in duct 5 does not function as a throttle portion to limit the sectional area of air flow passage 54, so that sufficient amount of the air can pass through duct 5, thereby the reduction of heat exchange performance (cooling performance) of the air in laminated type refrigerant evaporator 8 (refrigerant-air heat exchange portion 45) being prevented.

As illustrated in FIG. 1, fixing space 57 for fixing a control device (computer) controlling each air-conditioning apparatus of automotive air conditioner 1, each air-conditioning control apparatus 56 such as relay circuits for supplying electricity and for stopping electric supply to each electric apparatus of automotive air conditioner 1 and so forth, and actuating means such as a servomotor of air mixing damper 9 and so forth can be formed on the outer surface at each side of protruding portion 55 in unit case 41. The space can be effectively used at the comparatively narrow front side of compartment 2.

Figure 4A:
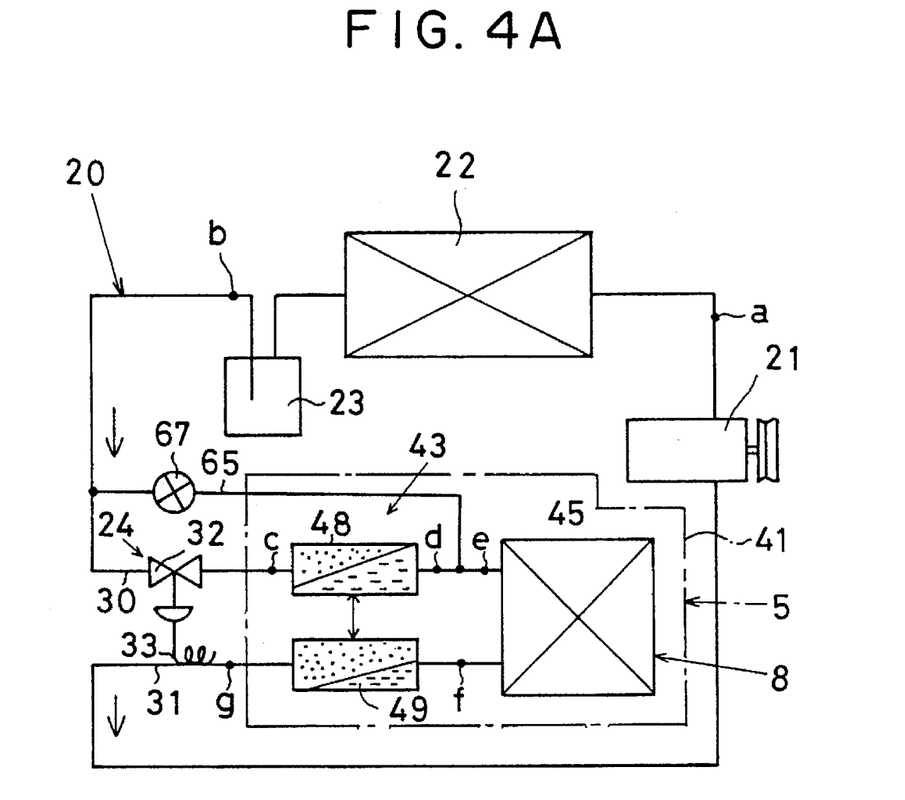
FIG. 4A is a construction view illustrating a refrigerant cycle applied to the second embodiment according to the present invention.

FIGS. 4A, 4B, 5 and 6 illustrate a second embodiment of the present invention. FIG. 4A illustrates the refrigerant cycle of the automotive air conditioner.

Next, thermostatic expansion valve 24 will be explained in detail with reference to FIGS. 4A and 5. Housing 29 of thermostatic expansion valve 24 comprises inlet refrigerant passage 30 and outlet refrigerant passage 31. A bypass pipe 65 having a bypass passage 65 therein is placed next to housing 29.

Bypass passage 65 is equipped with a constant pressure valve 67. Constant pressure valve 67 opens when condensed pressure (high pressure of refrigerant cycle 20) of refrigerant condenser 22 decreases lower than a predetermined pressure (for example 6 kg/cm$^2$ G) such as in winter, as illustrated in FIG. 4A. The refrigerant is directly introduced to refrigerant-air heat exchange portion 45 by bypassing inlet refrigerant passage 48 of refrigerant-refrigerant heat exchange portion 43 in the laminated type refrigerant evaporator, because the dryness of the refrigerant, of which pressure is reduced while passing through constant pressure valve 67 if the value of high pressure is for instance at 6 kg/cm$^2$ G or below, becomes almost equal to the dryness of the heat exchanged refrigerant at refrigerant-refrigerant heat exchange portion 43.

Next, laminated type refrigerant evaporator 8 of the present embodiment is explained in detail with reference to FIGS. 4A, 5 and 6. Laminated type refrigerant evaporator 8 comprises joint block 42, refrigerant-refrigerant heat exchange portion 43, and refrigerant-air heat exchange portion 45 and so forth, and is contained in unit case 41 of duct 5 in the same way as the first embodiment.

Joint block 42 includes therein an inlet passage 71 connected to inlet refrigerant passage 30 in housing 29, an outlet passage 72 connected to outlet refrigerant passage 31, and a bypass passage 73 forming bypass passage 65.

Figure 5:
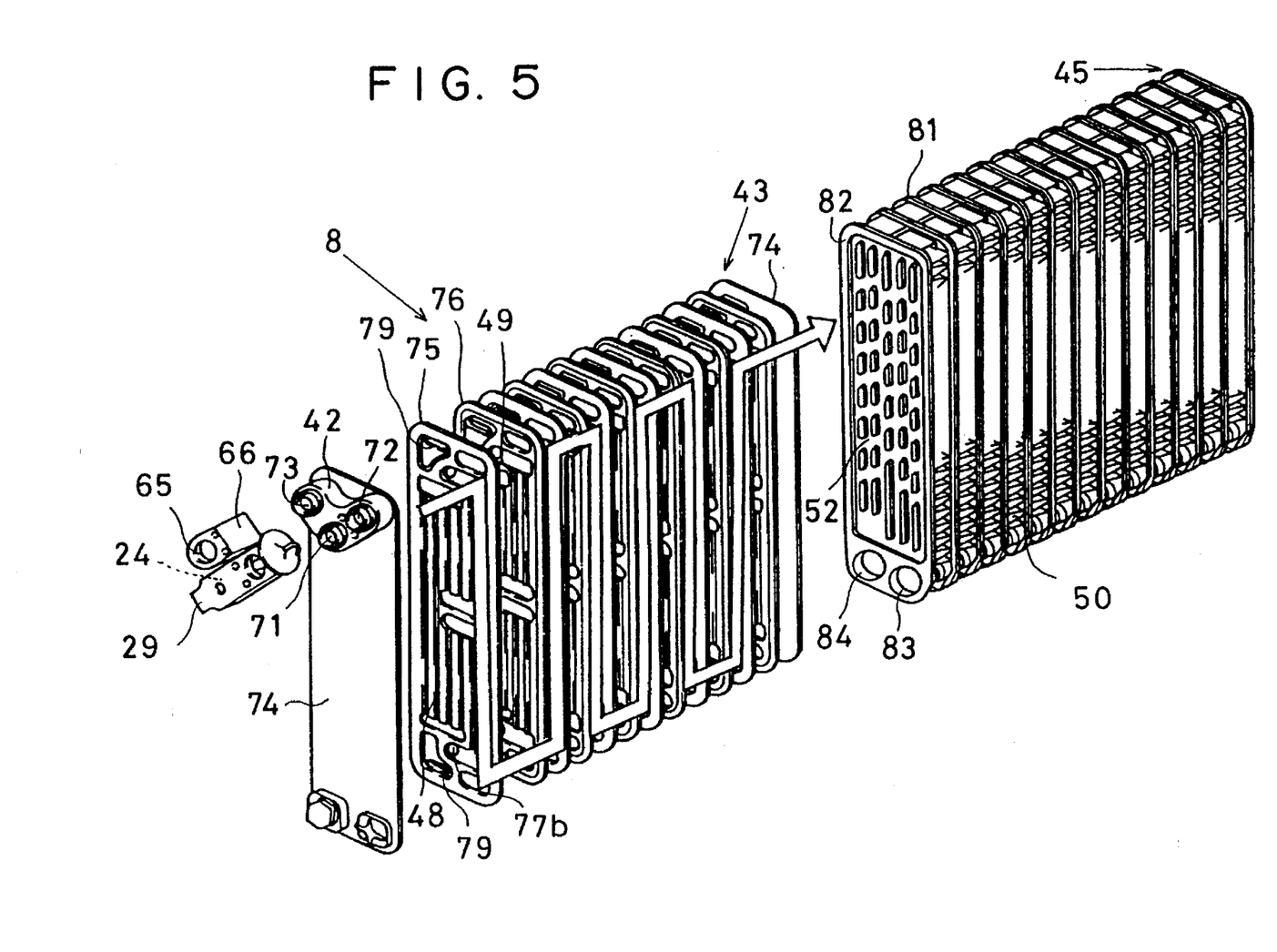
FIG. 5 is a construction view illustrating the main parts of the refrigerant cycle applied to the third embodiment according to the present invention.

In refrigerant-refrigerant exchange portion 43, as illustrated in FIG. 5, plural pairs of core plates 75 and 76 are horizontally laminated between a pair of end plates 74. Several pairs of core plates 75 and 76, molded into the same shape of thin plates by pressing, etc., are connected with each other by welding, or brazing.

Inlet refrigerant passage 48 for introducing the refrigerant from inlet passage 71 to refrigerant-air heat exchange portion 45 is formed between the front side of core plate 75 and the back side of core plate 76. Outlet refrigerant passage 49 for introducing the refrigerant from refrigerant-air heat exchange portion 45 to outlet passage 72 is formed between the back side of core plate 75 and the front side of core plate 76.

Figure 6:
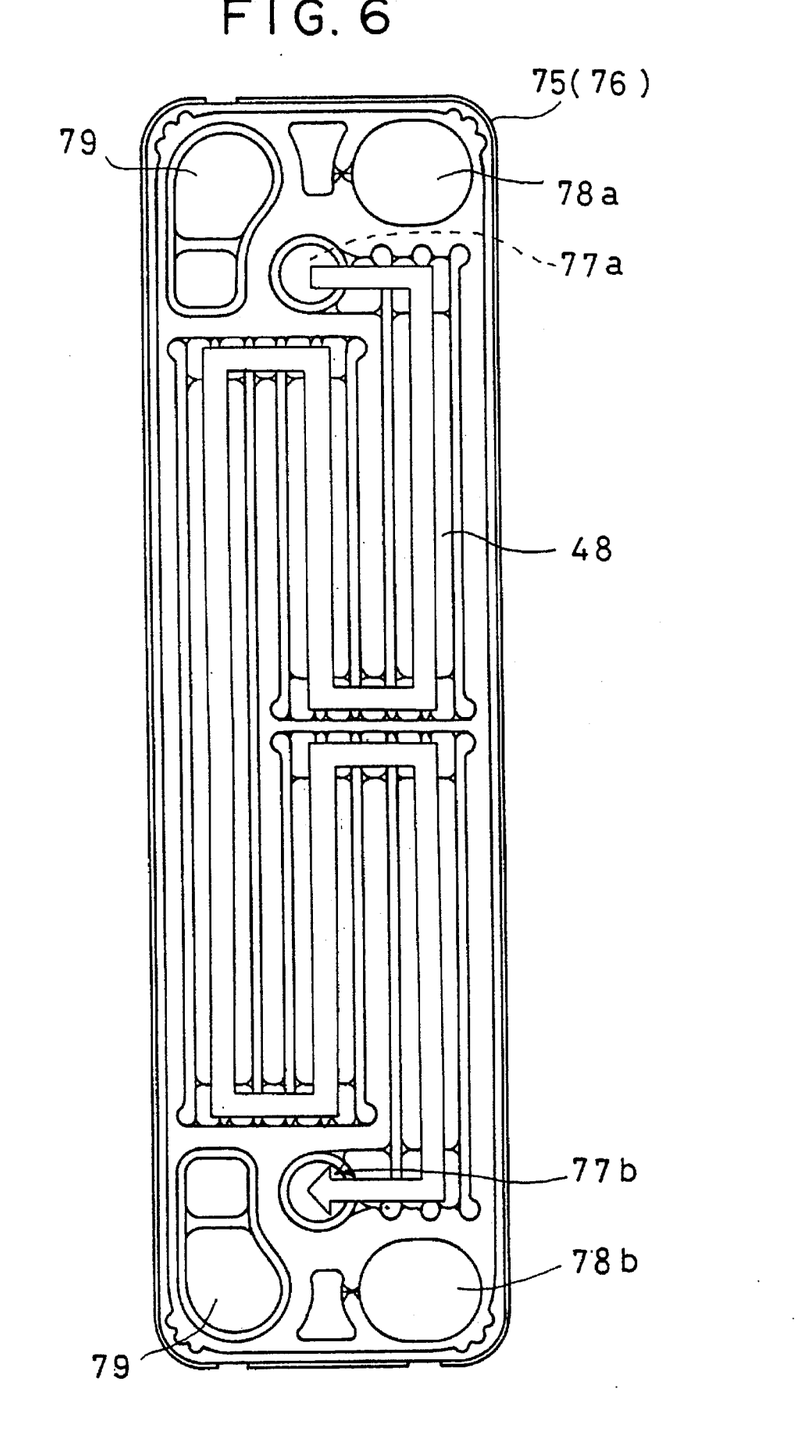
FIG. 6 is an exploded view illustrating the laminated type refrigerant evaporator applied to the third embodiment according to the present invention.

Inlet refrigerant passage 48, as illustrated in FIGS. 5 and 6, passes continuously through circular passing holes 77a and 77b, which are formed at the top portion and the bottom portion of core plates 75 and 76, and communicates with inlet passage 71 of joint block 42. Namely, inlet refrigerant passage 48 reduces pressure gradually by passage resistance which is provided by increasing the number of turns the refrigerant makes. All plural inlet refrigerant passages 48 formed between core plates 75 and 76 communicate in series with each other.

Outlet refrigerant passage 49 passes continuously through circular passing holes 78a and 78b, which are formed at the top portion and the bottom portion of core plates 75 and 76, and also communicates with outlet passage 72 of joint block 42. Plural outlet refrigerant passages 49 are placed in parallel between core plates 75 and 76. An oval bypass hole 79 communicating with a bypass passage 73 (bypass passage 65) of joint block 42 is provided at an end of core plates 75 and 76.

Refrigerant-air heat exchange portion 45 comprises horizontally multi-layered corrugated fins 50 and refrigerant passage pipes 81 containing the refrigerant evaporation passages 52. Refrigerant passage pipes 81 are connected with a pair of core plates 82 by welding, or brazing inlet tank portion 83 and outlet tank portion 84 are provided at the bottom of the pair of core plates 82.

Figure 4B:
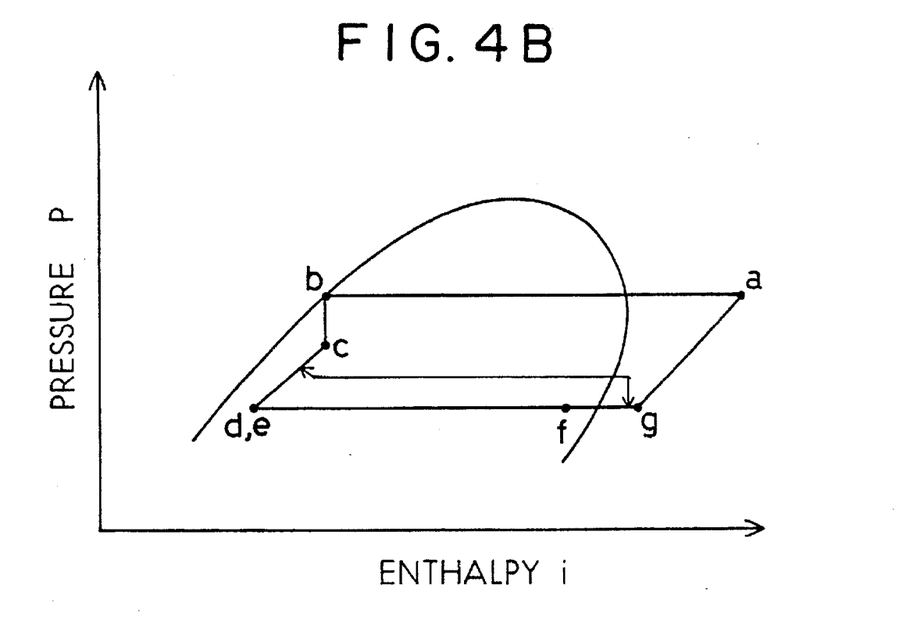
FIG. 4B is a Mollier chart of the refrigerant cycle drawn in 4A.

Next, the operation of refrigerant cycle 20 of automotive air conditioner 1 in this embodiment will be briefly described with reference to FIGS. 4A, 4B and 5. FIG. 4B is a Mollier chart of condition points of the refrigerant on the refrigerant circuit for refrigerant cycle 20. Points shown with alphabets from a to g on the Mollier chart in FIG. 4B correspond to condition points from a to g of the refrigerant on the refrigerant circuit for the refrigerant cycle 20 in FIG. 4A.

High temperature and high pressure gas refrigerant (condition point a), compressed by refrigerant compressor 21 and discharged from a discharging outlet, flows in refrigerant condenser 22. The gas refrigerant flowing in refrigerant condenser 22 is deprived of the heat by outside air when passing through refrigerant condenser 22, and cooled, condensed, and liquified. The high temperature liquified refrigerant, flowing out of refrigerant condenser 22, subsequently flows in receiver 23 in order to separate liquid from gas (condition point b) and reaches expansion valve body 32 of thermostatic expansion valve 24.

The pressure of the liquified refrigerant reaching expansion valve body 32 is reduced when passing through expansion valve body 32 and becomes refrigerant with a two-phase condition (condition point c) such as the gas refrigerant and liquified refrigerant, and then the refrigerant flows in inlet refrigerant passage 48 in refrigerant-refrigerant heat exchange portion 43 of laminated type refrigerant evaporator 8. Refrigerant with a two-phase condition of gas and liquid flowing in inlet refrigerant passage 48 is cooled by heat exchange with the outlet refrigerant flowing in outlet refrigerant passage 49, and changes from the two-phase condition of gas and liquid to a liquid phase, thereby the refrigerant being almost mono-phase condition (condition point d, condition point e). As illustrated in FIG. 5, inlet refrigerant passage 48 includes a large number of turns which reduce the pressure of the refrigerant, thereby eliminating a fixed throttle. The number of parts can be reduced.

The refrigerant with almost mono-phase liquid condition flows in refrigerant-air heat exchange portion 45 and is distributed evenly (uniformly) to refrigerant evaporation passages 52. The refrigerant, when passing each refrigerant evaporation passage 52, is heat exchanged with air in unit case 41, thereby being evaporated and vaporized (condition point f). In this embodiment, since super heat is achieved in outlet refrigerant passage 49 as described below, the refrigerant passing through each refrigerant evaporation passage 52 is prevented from evaporating and vaporizing until the refrigerant becomes overheated vapor.

The refrigerant flowing out of each refrigerant evaporation passage 52 flows in outlet refrigerant passage 49 of refrigerant-refrigerant heat exchange portion 43. The refrigerant flowing in outlet refrigerant passage 49 is heat exchanged with the inlet refrigerant passing in inlet refrigerant passage 48 so that the refrigerant is heated so as to be overheated vapor (condition point g). The gas refrigerant in the form of overheated vapor is taken in to intake port of refrigerant compressor 21 through pipe joint 36 and outlet refrigerant passage 31 of housing 29, equipped with outlet pipe 47 and thermo-sensitive tube 33.

Figure 7:
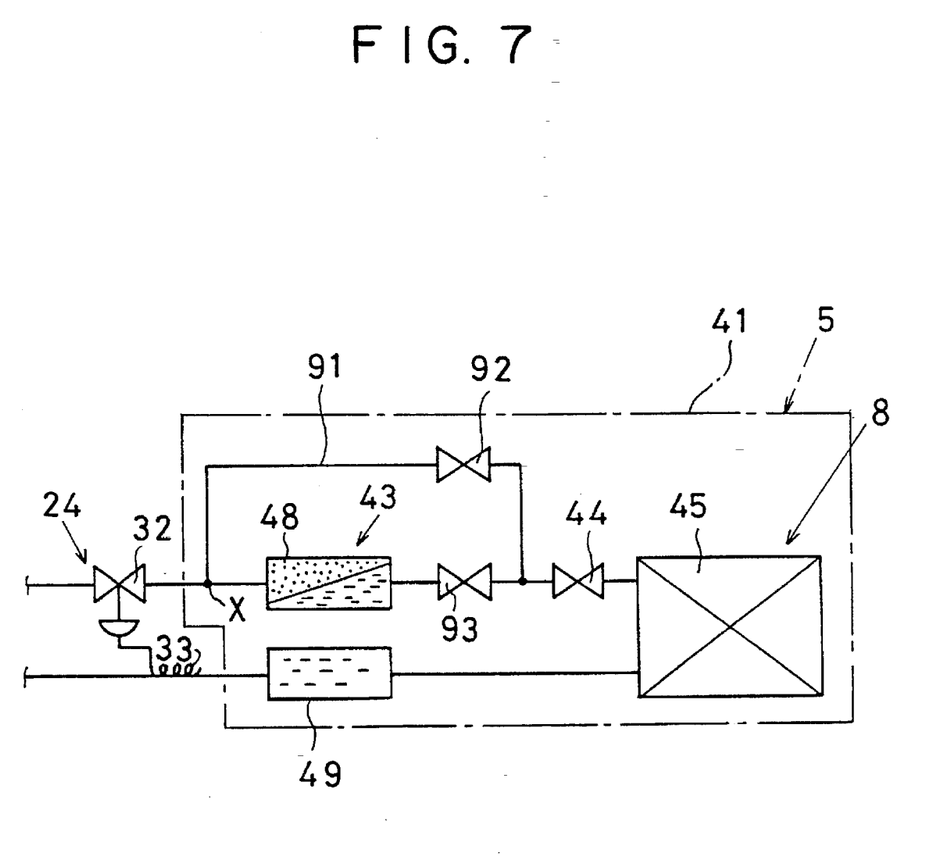
FIG. 7 is a plan view illustrating the core plate of the laminated type refrigerant evaporator in FIG. 6.

FIG. 7 illustrates a main part of the refrigerant cycle of the automotive air conditioner according to a third embodiment. Laminated type refrigerant evaporator 8 in this embodiment has a bypass passage 91 where the refrigerant flowing in from expansion valve body 32 of thermostatic expansion valve 24 can bypass inlet refrigerant passage 48 in refrigerant-refrigerant heat exchange portion 43. Laminated type refrigerant evaporator 8 is contained in unit case 41 of duct 5 in the same way as the first embodiment. Bypass passage 91 is equipped with a fixed throttle 92 as pressure reducing means. Similarly, inlet refrigerant passage 48 in refrigerant-refrigerant heat exchange portion 43 is equipped with a fixed throttle 93 as pressure reducing means.

In this embodiment, it is possible to suppress the refrigerant flowing in inlet refrigerant passage 48 from being heated when the temperature of the liquified refrigerant flowing in outlet refrigerant passage 49 is higher (e.g., in case of an inside air mode during winter) than the temperature of the refrigerant of two-phase condition of gas and liquid flowing in inlet refrigerant passage 48 in refrigerant-refrigerant heat exchange portion 43.

It is also suggested to install a gas-liquid separator on the dividing point X of bypass passage 91, so that liquified refrigerant can flow mainly in bypass passage 91 while gas refrigerant can flow mainly in inlet refrigerant passage 48.

Laminated type refrigerant evaporator 8 is used as a refrigerant evaporator in this embodiment, however, a refrigerant evaporator with a circular tube plate fin type, a deformed tube corrugated fin type or the other types with different shapes can be also employed.

In this embodiment, one fixed throttle 44 is placed between plural refrigerant evaporation passages 52 and inlet refrigerant passage 48; however, plural fixed throttles can be also placed between plural refrigerant evaporation passages 52 and inlet refrigerant passage 48. A fixed throttle such as a capillary tube or a variable throttle can be used instead of the fixed throttle (orifice) as pressure reducing means.

In this embodiment, refrigerant cycle 20 with a receiver cycle type is used as a refrigerant cycle; however, an accumulator cycle type may be used as a substitute refrigerant cycle. Further, a fixed throttle such as a capillary tube or an orifice may be able to replace thermostatic expansion valve 24.

The present invention has been described in connection with what are presently considered to be the most practical preferred embodiments, however, the invention is not limited to the disclosed embodiments, but rather is intended to include all modifications and alternative arrangements included within the spirit and the scope of the appended claims.

What is claimed is:

1. An air conditioner comprising:

a refrigerant-air heat exchange portion having plural refrigerant evaporation passages to evaporate refrigerant flowing therein and heat exchanging between refrigerant flowing in said plural refrigerant evaporation passages and air passing around said plural refrigerant evaporation passages;

a refrigerant-refrigerant heat exchange portion having an inlet refrigerant passage in which said refrigerant flows toward said plural refrigerant evaporation passages and an outlet refrigerant passages in which refrigerant coming from said plural refrigerant evaporation passages and heat exchanging between refrigerant flowing in said inlet refrigerant passage and refrigerant flowing in said outlet refrigerant passage;

a pressure reducing unit placed in an upstream side of said plural refrigerant evaporation passages; and a unit case having an air flow passage therein, wherein the refrigerant-air heat exchange portion is integrated with the refrigerant-refrigerant heat exchange portion as one unit having a substantially rectangular parallelepiped shape and wherein the unit case has a substantially rectangular cross-sectional shape and includes a protruding portion, at least a substantial portion of said refrigerant-air heat exchange portion being disposed in said air flow passage of said unit case, and at least a substantial portion of said refrigerant-refrigerant heat exchange portion being received in said protruding portion of said unit case whereby at least a substantial portion of said refrigerant-refrigerant heat exchange portion is outside said air flow passage.

2. An air conditioner according to claim 1, wherein said refrigerant-refrigerant heat exchange portion includes an inlet pipe arranged to connect to a refrigerant pipe at an upstream side of said inlet refrigerant passage and an outlet pipe arranged to connect to a refrigerant pipe at a downstream side of said outlet refrigerant passage, said inlet pipe and said outlet pipe extending out of said unit case.

3. An air conditioner according to claim 1, wherein said pressure reducing unit is provided at an upstream side of said refrigerant-refrigerant heat exchange portion.

4. An air conditioner according to claim 1, further comprising:

means for defining a bypass passage bypassing said inlet refrigerant passage.

5. An air conditioner according to claim 4, wherein said pressure reducing unit is provided in said bypass passage.

6. An air conditioner according to claim 4, wherein said pressure reducing unit is provided in said outlet refrigerant passage.

7. An air conditioner according to claim 1, further comprising an inside/outside air switching case disposed upstream of said unit case, an inside/outside air switching damper being disposed within said inside/outside air switching case, and wherein a blower fan, an air mixing damper and a heater core are disposed in said unit case.

8. An air conditioner according to claim 1, wherein said blower fan is disposed between said inside/outside air switching case and said refrigerant-air heat exchange portion, said heater core is disposed downstream of said refrigerant-air heat exchange portion and said air mixing damper is disposed between said refrigerant-air heat exchange portion and said heater core.

9. An air conditioner a refrigerant-air heat exchange portion having plural refrigerant evaporation passages to evaporate refrigerant flowing therein and heat exchanging between refrigerant flowing in said plural refrigerant evaporation passages and air passing around said plural refrigerant evaporation passages;

a refrigerant-refrigerant heat exchange portion having an inlet refrigerant passage in which said refrigerant flows toward said plural refrigerant evaporation passages and an outlet refrigerant passages in which refrigerant coming from said plural refrigerant evaporation passages and heat exchanging between refrigerant flowing in said inlet refrigerant passage and refrigerant flowing in said outlet refrigerant passage;

a pressure reducing unit placed in an upstream side of said plural refrigerant evaporation passages; and a unit case having an air flow passage therein, said refrigerant-air heat exchange portion being contained in said air flow passage, and said unit case containing refrigerant-refrigerant heat exchange portion outside said air flow passage;

means for defining a bypass passage bypassing said refrigerant-refrigerant heat exchange portion and said pressure reducing unit; and a valve element disposed in said bypass passage and opening and closing said bypass passage in accordance with a refrigerant pressure at the upstream side of said pressure reducing unit.

* * * * *